(12) United States Patent
Holtsberg et al.

(10) Patent No.: US 7,580,573 B2
(45) Date of Patent: *Aug. 25, 2009

(54) SEGMENTATION-BASED RECOGNITION

(75) Inventors: Anders Holtsberg, Lund (SE); Jakob Sternby, Lund (SE)

(73) Assignee: Zi Decuma AB, Lund (SE)

( * ) Notice: Subject to any disclaimer, the term of this patent is extended or adjusted under 35 U.S.C. 154(b) by 692 days.

This patent is subject to a terminal disclaimer.

(21) Appl. No.: 11/270,858

(22) Filed: Nov. 9, 2005

(65) Prior Publication Data

US 2006/0110041 A1    May 25, 2006

(30) Foreign Application Priority Data

Nov. 12, 2004    (SE)    .................................... 0402773

(51) Int. Cl.
G06K 9/18    (2006.01)
G06K 9/34    (2006.01)
(52) U.S. Cl. ...................................... 382/186; 382/173
(58) Field of Classification Search ................. 382/173, 382/181, 186–187, 190, 201, 209, 218
See application file for complete search history.

(56) References Cited

U.S. PATENT DOCUMENTS

| | | | |
|---|---|---|---|
| 5,282,047 A | 1/1994 | Suzuki | |
| 5,392,363 A | 2/1995 | Fujisaki et al. | |
| 5,757,959 A | 5/1998 | Lopresti | |
| 5,812,697 A | 9/1998 | Sakai et al. | |
| 5,923,793 A | 7/1999 | Ikebata | |
| 6,339,655 B1 * | 1/2002 | Aharonson et al. | 382/186 |
| 6,738,519 B1 * | 5/2004 | Nishiwaki | 382/228 |

FOREIGN PATENT DOCUMENTS

| | | |
|---|---|---|
| CA | 2 554 453 A1 | 8/2005 |
| EP | 0 539 749 A2 | 5/1993 |
| WO | WO 02/37933 A2 | 5/2002 |

OTHER PUBLICATIONS

Abstract No. 364250, Jul. 11, 1999, Iinventec Corp.
Taiwan Search Report 094137814, May 21, 2008.

* cited by examiner

*Primary Examiner*—Daniel G Mariam
(74) *Attorney, Agent, or Firm*—Michael A. Glenn; Glenn Patent Group (57) ABSTRACT

A method for recognition of a handwritten pattern comprises selecting core points among a sequence of detected points of the handwritten pattern. The core points are selected for use in segmenting and recognizing the handwritten pattern. The method further comprises determining features of each core point, and comparing the handwritten pattern to templates. The comparing comprises stepwise analyzing the core points in sequence by matching the features of sequences of core points that either start with the first core point or the last core point of a previous sequence to said templates and calculating a distance value, and assigning a cumulative distance value to the last core point in the matched sequence of core points, whereby a smallest cumulative distance value is assigned to the last core point and corresponds to a sequence of matched templates which represent a possible recognition result of the handwritten pattern.

23 Claims, 4 Drawing Sheets

SEGMENTATION-BASED RECOGNITION

CROSS-REFERENCE TO RELATED APPLICATION

This application claims the benefit of priority to Swedish patent application number 0402773-6, filed on Nov. 12, 2004.

TECHNICAL FIELD

The present invention relates to a method for recognition of a handwritten pattern comprising one or more curves representing a plurality of symbols.

BACKGROUND OF THE INVENTION

Today, handwriting is becoming an increasingly popular method for inputting data to data handling units, especially to mobile phones and Personal Digital Assistants (PDAs). In order to handle the inputted data, the handwriting must be recognized and interpreted. Most existing methods for recognizing handwriting require that the characters that are to be inputted are written one by one and are separately recognized. An example of such a method is provided in U.S. Pat. No. 4,731,857, but the most famous is Graffiti®, manufactured by Palm, Inc.

In order to speed up input of data it is desired that cursive handwriting is allowed. However, recognition of cursive handwriting is far more complex than recognition of separate characters. The increase in complexity for cursive handwriting recognition is owed to the problem of segmenting connected characters, i.e. to identify the transition from one character to another within the handwritten pattern. Errors in cursive handwriting recognition may hence come in two levels, that is errors in segmentation and errors in recognition of the separated characters, which greatly complicate the construction of a lucid sequential recognition system.

Methods for recognition of cursive handwriting generally suffer from the problem that there are a lot of possible segmentations between adjacent characters forming a combinatorial explosion of possible segmentations of a handwritten pattern.

Most commercial systems today therefore employ complicated statistical systems using neural networks and hidden markov models with integrated dictionaries. Examples of such systems are presented in P. Neskovic and L. Cooper, "Neural network-based context driven recognition of on-line cursive script", *Seventh International Workshop on Frontiers in Handwriting Recognition Proceedings*, p. 352-362, September 2000 and M. Schenkel and I. Guyon, "On-line cursive script recognition using time delay networks and hidden markov models", *Machine Vision and Applications*, vol. 8, pages 215-223, 1995. A major setback of these systems is that they are large and require large training sets. Furthermore they are highly dependent on the dictionary used.

SUMMARY OF THE INVENTION

It is an object of the invention to provide an improved method for cursive handwriting recognition. Another object of the invention is to provide a method which quickly segments and recognizes the handwritten pattern. A further object of the invention is to provide a method which does not require extensive learning and which does not need great processing power.

At least some of the above objects are achieved by means of a method, a device and a computer program product according to the independent claims. Specific embodiments of the invention are set forth in the dependent claims.

Thus, an embodiment of the invention may provide a method for recognition of a handwritten pattern comprising one or more curves representing a plurality of symbols. Such a method comprises detecting the handwritten pattern as a sequence of points along the one or more curves of the handwritten pattern, and selecting core points among the sequence of points. The core points are selected for use in segmenting the handwritten pattern and recognizing these segments of the handwritten pattern as symbols. The method further comprises determining features of the one or more curves at or in the vicinity of each core point, and comparing the handwritten pattern to templates, wherein each template represents at least one symbol or part of a symbol. The comparing may comprise: stepwise analyzing the core points in sequence, wherein core points represent possible segmentation points and sequences of core points from a first possible segmentation point to a second possible segmentation point represent possible symbols, said analyzing being performed by matching the features of sequences of core points that either start with the first core point or the last core point of a previous sequence of core points to said templates and calculating a distance value, and assigning a cumulative distance value to the last core point in the sequence of core points, whose features have been matched to the templates, said cumulative distance value being a sum of a distance value assigned to the first core point in the sequence and the calculated distance value. Hereby, a smallest cumulative distance value for all sequential core points is assigned to the last core point and corresponds to a sequence of matched templates which represent a plurality of symbols as a possible recognition result of the handwritten pattern.

The invention also may be embodied as a device for recognition of a handwritten pattern comprising one or more curves representing a plurality of symbols, said device comprising: a detector arranged to detect the handwritten pattern as a sequence of points along the one or more curves of the handwritten pattern; an analyzer arranged to select core points among the sequence of points, wherein said core points are selected for use in segmenting the handwritten pattern and recognizing these segments of the handwritten pattern as symbols; the analyzer may be further arranged to determine features of the one or more curves at or in the vicinity of each core point; the analyzer may be further arranged to compare the handwritten pattern to templates, each template representing at least one symbol or part of a symbol, wherein the analyzer being arranged to compare the handwritten pattern to templates is arranged for: stepwise analyzing the core points in sequence, wherein core points represent possible segmentation points and sequences of core points from a first possible segmentation point to a second possible segmentation point represent possible symbols, said analyzing being performed by matching the features of sequences of core points that either start with the first core point or the last core point of a previous sequence of core points to said templates and calculating a distance value, and assigning a cumulative distance value to the last core point in the sequence of core points, whose features have been matched to the templates, said cumulative distance value being a sum of a distance value assigned to the first core point in the sequence and the calculated distance value, whereby a smallest cumulative distance value for all sequential core points is assigned to the last core point and corresponds to a sequence of matched templates which represent a plurality of symbols as a possible recognition result of the handwritten pattern.

The invention also may be embodied as a computer program product, directly loadable into the internal memory of a data handling unit, comprising software code portions for performing the above-defined method.

Thanks to the invention, a handwritten pattern representing several symbols may be quickly recognized. By using the core points both for segmentation and recognition, the calculations will simultaneously separate the handwritten pattern and match the pattern with templates. Thereby, the process of comparing the handwritten pattern to templates is very quick. After all core points have been analyzed, cumulative distance values will be assigned to the last core point and be associated with sequences of templates that have been matched with the handwritten pattern. Thus, the information assigned to the last core point could easily be used for obtaining possible recognition results of the handwritten pattern.

It is an insight of the invention that a limited number of core points may be used, since it is only required to select the core points needed for identifying segmentation points in the handwritten pattern. Thus, it has been realized that there is no requirement to use neural networks or hidden markov models in order to recognize cursive handwriting. Instead, the core points that are possible segmentation points are selected and the same core points are used for recognition of symbols within the handwritten pattern.

The selection of core points discards a great number of points from the detected sequence. Thus, a manageable number of core points are chosen, which restrains the computational efforts needed for comparing sequences of core points to templates. It has been realized that a great part of the information in the detected sequence of points is redundant for recognizing the handwritten pattern. Therefore, discarding a great number of points will hardly affect the possibility to correctly recognize the handwritten pattern. Also, since a limited number of points are used in the recognition, several templates may be used for recognizing the same symbol. Thus, the templates may represent allographs, i.e. different appearances or styles of writing the same symbol.

Advantageously, only core points that constitute possible segmentation points in the handwritten symbol are selected. This certainly keeps down the number of core points to be analyzed, whereby the method is fast.

As used herein, the term "symbol" should be construed as any form that has a specific meaning, such as a character, Latin, Chinese or any other kind, a ligature between, before or after characters, a number, or any punctuation mark. Further, the term "handwritten pattern" should be construed as the specific form of a symbol or sequence of symbols which has been written by a person.

According to an embodiment, the comparing is performed by forming a graph having nodes and arches connecting the nodes, wherein each node represents a core point corresponding to a possible segmentation point between two symbols in the handwritten pattern and each arch represents a path along a sequence of core points from one node to another node, said path corresponding to a possible symbol in the handwritten pattern, assigning at least one distance value to each path by matching the features of the sequence of core points to said templates, and determining at least the path through the graph from the first node to the last node with the smallest cumulative distance value, said path corresponding to a sequence of matched templates which represent a possible recognition result of the handwritten pattern.

By forming a graph, the stepwise analyzing of the sequential core points may be structured. This implies that a good control of the calculations to be performed is obtained and the results of cumulative distances may be structurally stored in connection to the nodes and arches. Further, the graph may be effectively used, since the size of the graph is easily handled as a great number of points may be discarded in the selecting of core points.

Several possible recognition results may be determined corresponding to paths through the graph having cumulative distance values below a threshold value. This implies that the comparing of the handwritten pattern to templates may return a number of candidates as recognition results of the handwritten pattern. These candidates could be handled in several different manners. The best candidate corresponding to the smallest cumulative distance value could be presented to a user. If this candidate is rejected, other candidates may be presented. Alternatively, several candidates may initially be presented.

The graph may be formed by sequentially adding core points as nodes and wherein said assigning of at least one distance value to each path is performed during forming of the graph. The required calculations may be performed as the graph is formed. This implies that the possible recognition results may be obtained from the graph as soon as it has been formed.

The assigning of at least one distance value comprises assigning each path the lowest distance value corresponding to the template that best matches the features of the sequence of core points. This implies that the graph may always hold information of the templates that, according to the used features, best match the sequences of core points.

A number of core points that are selected may be limited by the shape of said one or more curves. This implies that the shape of the curves dictate the number of core points that are selected. In this way, a fewer number of core points may be selected where the shape of the curves is simple, whereas a greater number of core points are selected for a complicated curve.

The number of core points that are selected may be limited to points holding information of directional changes of said one or more curves. Thus, points in which the curves are bent or turned are used as core points. This enables the core points to describe the shape of the one or more curves, even though a limited number of core points are used.

The selecting of core points may comprise selecting points which are local extreme points of said one or more curves in a direction orthogonal to a main writing direction of the handwritten pattern. These selected core points may often correspond to possible segmentation points. Thus, this selection criterion picks out a set of core points which has a good probability of holding a major portion of the segmentation points. Further, these local extreme points are significant for shapes of symbols and are therefore also suitable for use in recognition.

According to an embodiment of the invention, the set of core points created by selecting local extreme points is extended by selecting one to three core points between each pair of local extreme points. These further core points are selected by using other criteria. Such a set of core points is suitable for use in segmenting and recognizing a handwritten pattern consisting of Latin characters.

The selecting of core points may comprise selecting points in which an absolute value of the derivative of the one or more curves exceeds a threshold value. This implies that core points are selected where the curve or curves make a sharp turn. This provides useful information for recognizing a symbol and further picks out possible segmentation points.

The selecting of core points may comprise selecting a core point where a deviation of the one or more curves from a straight line between two adjacent core points exceeds a threshold value. This implies that a core point describing a curvature of the one or more curves is selected. Thus, information on the shape of the curve or curves is preserved, which is useful for recognition. The core points selected in this manner also have a large probability of being segmentation points.

The selecting of core points may comprise any combination of the selection criteria given above or may use further selection criteria that are bound to select possible segmentation points.

The determining of features may comprise determining a y-coordinate of the core point, said y-coordinate defining a position in a direction orthogonal to a main writing direction. This is useful in distinguishing between characters that mainly differ in size.

The determining of features may comprise determining a direction of the curve towards the core point and a direction of the curve from the core point. This gives information on the shape of the curve and is therefore very useful in comparing a handwritten pattern to a template.

The determining of features may comprise determining a x-coordinate displacement from a previous core point, said x-coordinate defining a position in a direction parallel with a main writing direction. This implies that the core points are related to each other. Thereby, a template need not be displaced in order to be correctly matched to a sequence of core points.

It has been found particularly suitable to determine the x-coordinate displacement from the previous core point with highest value of the x-coordinate.

The determining of features may comprise determining whether a pen has been lifted up or pressed down in the core point. This feature often indicates a segmentation point, but may also indicate a break between two strokes in a symbol. Therefore, the feature may be used for recognizing symbols that allow a pen being lifted or pressed down in the core point.

The distance value between a core point in the handwritten pattern and a point of a template may be calculated as a weighted sum of the distance between each feature of the core point and the point of the template. Thus, the determined features may be given different weights according to their importance for recognition. Further, all features contribute to the distance value.

The handwritten pattern may be compared to templates, wherein a plurality of templates represent different appearances of the same symbol. The plurality of templates representing the same symbol provide that different allographs are possible to recognize. Further, since a template is represented only by a limited number of features, it is possible to store quite a large number of templates while having a database of templates of a manageable size.

The possible recognition result of the handwritten pattern may be compared to a dictionary. This implies that a candidate determined by comparing the handwritten pattern to templates may be further evaluated by being compared to a dictionary. Hereby, the candidate to be presented to a user may be e.g. the candidate having a smallest cumulative distance value or the candidate with smallest cumulative distance value among candidates that exist in the dictionary. However, this further evaluation using a dictionary is not necessary for obtaining possible recognition results. Therefore, the comparing of the handwritten pattern to templates will give recognition results without the use of a dictionary.

It is not a preliminary aim of the invention to always correctly interpret what is intended by the handwritten pattern. Thus, the method does not independently identify when the handwritten pattern lacks some information or contains erroneous information, such as when a character is left out in the handwritten pattern or when the handwritten pattern is misspelled. However, it provides a solid base to supplement with other context and string matching routines so that words that are not possible to correctly recognize merely by examining the handwritten pattern itself may also be recognized.

Further, specific sequences of matched templates may be disallowed. This could be helpful in compensating for situations where the information in the handwritten pattern is not correct. However, it may also be used for improving the recognition results by rejecting impossible or unlikely candidates. For example, a sequence of two ligatures may be disallowed.

A weight may be given to the cumulative distance value for specific sequences of matched templates. This implies that recognition results comprising unlikely sequences of templates are not completely rejected, but may be given a weight to make it more difficult for these recognition results to have the smallest cumulative distance value.

The handwritten pattern may be written in cursive writing. The method is especially suited for recognition of handwritten patterns in cursive writing. However, the method may also be used for recognizing handwritten patterns where symbols are separately written. Especially, the method does not require that the handwritten pattern is written in one stroke.

BRIEF DESCRIPTION OF DRAWINGS

The invention will now be described in further detail by way of example under reference to the accompanying drawings, on which.

DETAILED DESCRIPTION OF A PREFERRED EMBODIMENT

Figure 1:
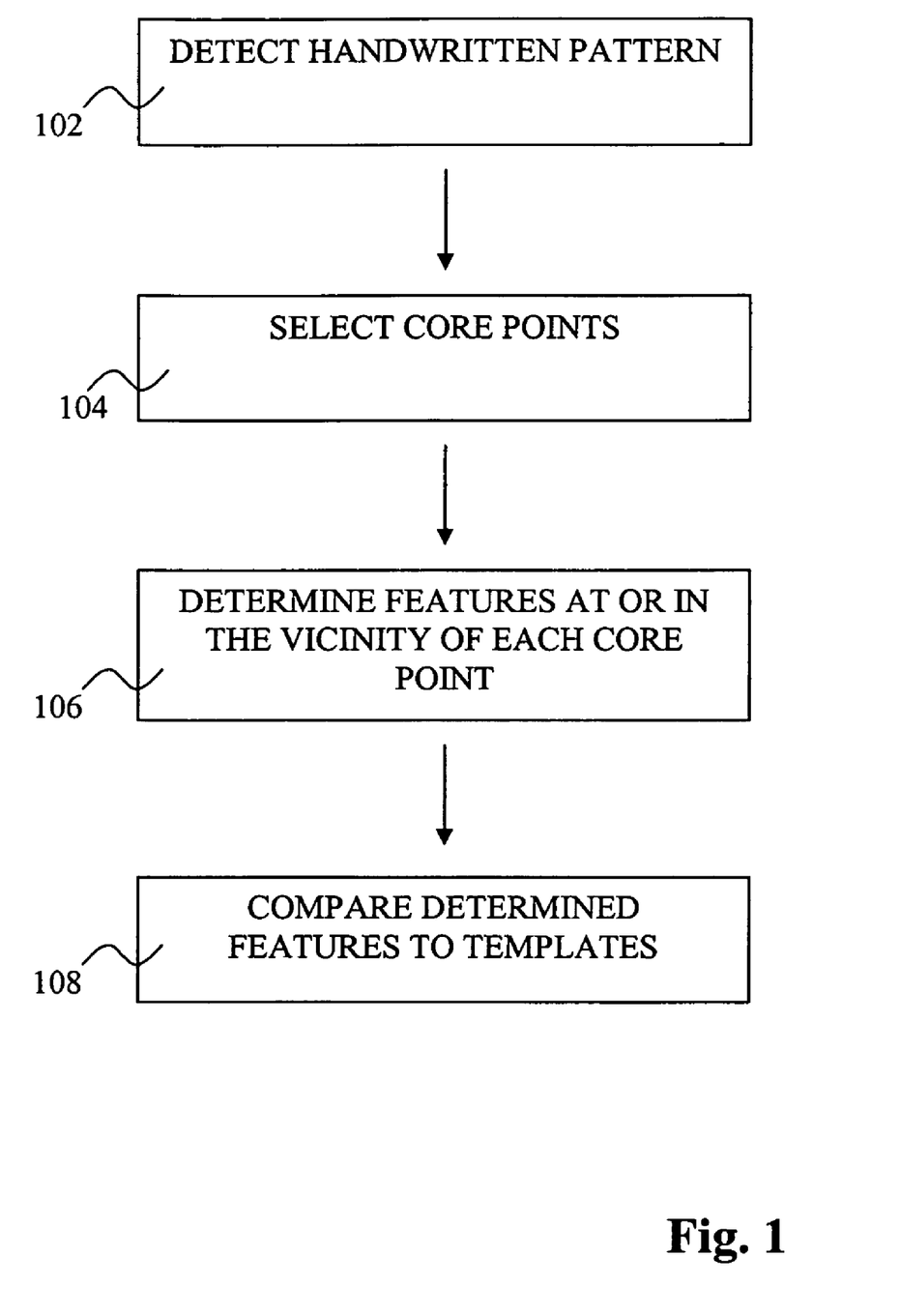
FIG. 1 is a flow chart of a method for recognizing a handwritten pattern according to an embodiment of the invention.

Referring to FIG. 1, a method for recognizing a handwritten pattern will now be described. First, the handwritten pattern is detected, step 102. Typically, a user may write the handwritten pattern with a stylus on a pressure-sensitive screen, whereby the handwriting is detected by sampling the position of the stylus at regular intervals. In this way, a time-sequence of points may be obtained. The handwriting may be detected in several other ways, such as by using sensors that detect e.g. an electrical connection being formed between a pen and a writing surface or sensors detecting movements of a pen. Also, the handwritten pattern may be detected by scanning a paper on which the handwritten pattern has been written. Then, the handwriting may be detected as a sequence of points on a writing surface, wherein the sequence depends on where the points are placed in relation to each other, i.e. a spatial sequence of points.

Now, core points are selected among the sequence of points created when detecting the handwritten pattern, step 104. The core points are selected in order to reduce the dimensionality of the handwritten pattern, i.e. the number of sampled points of a stroke in the pattern. Yet, the core points should be selected such that the handwritten pattern may be correctly recognized.

Figure 2:
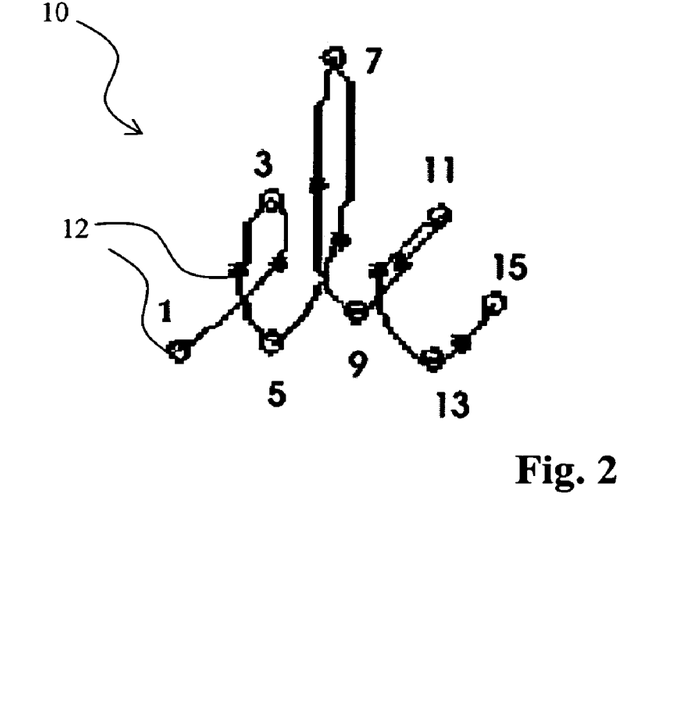
FIG. 2 is an example of a handwritten pattern indicating selected core points to be used for comparing the handwritten pattern to templates.

FIG. 2 shows a handwritten pattern 10 forming the Swedish word "ek". In FIG. 2, the selected core points 12 are also indicated and every other core point is numbered. It is evident from FIG. 2 that the first part of this cursive word may have the appearance of the letter "d". The problem is that if the recognition method segments the word at the endpoint of that "d" into two letter segments, neither of these will contain the letters of the word that was intended. It is therefore clear that the recognition method needs to consider more than one segmentation possibility when segmenting cursive handwriting. Therefore, several core points 12 are selected as possible points indicating a segmentation in the handwritten pattern 10 between two characters. Thus, the core points 12 are selected to identify the correct segmentation of the handwritten pattern 10 into separate symbols or characters. However, the core points 12 are also used for recognition of the segments of the handwritten pattern 10.

The selection of core points 12 should avoid throwing away a segmentation point. However, the number of core points 12 defining potential segmentations of the handwritten pattern 10 should be selected in such a way as to keep down the number of core points 12 as much as possible. The selection of core points 12 therefore uses some selection criteria.

According to a presently preferred embodiment, the following selection criteria are used. The first selection criterion extracts the extreme points in a direction orthogonal to a main writing direction. We denote these points by north (N) and south (S) core points, respectively. In the handwritten pattern 10 in FIG. 2, the N and S core points are marked by circles. Each pair of N-S points have been complemented by an additional one to three points lying in between. These latter points have been selected by two further criteria, a curvature and a sharpness criteria. We call the extra points middle (M) core points. In the handwritten pattern 10 in FIG. 2, the M core points are marked by solid circles. The curvature criterion determines whether the handwritten pattern 10 deviates significantly from a straight line between two adjacent core points. Then, an M core point is selected at a position deviating most from the straight line. The sharpness criterion determines whether the handwritten pattern makes a sharp turn. Then, an M core point is selected at this position. The decision whether the sharpness criterion is met is made by calculating the derivative of the handwritten pattern 10 in each detected point. Where a sharp turn is made, the derivative assumes a large value. The sharpness and curvature criteria may be used for selecting several M core points between a pair of N-S core points.

The method further comprises determining features of the handwritten pattern at or in the vicinity of each core point, step 106. It is conceivable to use the coordinate values of the extracted core points 12 directly for recognition purposes. However, the surrounding to a core point 12 also may contain some information of the shape of the handwritten pattern 10. In order to include this extra shape information, a set of five features for each core point is determined according to the presently preferred embodiment. Each core point 12 is given a label from a label set according to how it has been selected. Here, the three labels N, S and M are used. This label of the core points 12 forms the basis used for matching core point sequences to templates. Further, the features comprise the directional vectors in towards and out from the core point 12. A directional vector defines the direction of a stroke at a point in the stroke. The directional vector in towards a core point 12 may be obtained by subtracting the coordinates of a point in the stroke just before the core point 12 from the coordinates of the core point 12. Similarly, the directional vector out from a core point 12 may be obtained by subtracting the coordinates of the core point 12 from the coordinates of a point in the stroke just after the core point 12. Moreover, the set of features comprises the y-coordinate value of the core point 12, i.e. the value in a direction orthogonal to the main writing direction, and the signed distance dx along an x-coordinate parallel to the main writing direction from the core point 12 to the previous core point furthest to the right.

The determined features of the selected core points 12 of the handwritten pattern 10 are now compared to templates, step 108, for finding a candidate or candidates for recognition of the handwritten pattern 10. The templates are provided in a database and are represented by features of sequential core points. Thus, the determined features are directly matched with features of the templates. The database may comprise several templates representing allographs of the same symbol in order to recognize patterns even though users have different styles of writing. Further, the database comprises templates representing ligatures, i.e. strokes that typically bind together two characters and are not part of the actual character. Most characters in the middle of cursive words will have ligatures, whereas characters at the beginning of a word may or may not have one. Cursive words may also end in a ligature. Some templates may represent a character with a ligature included. This may advantageously be used for templates of the characters "e", "r", "c", "x" and "s".

Figure 3:
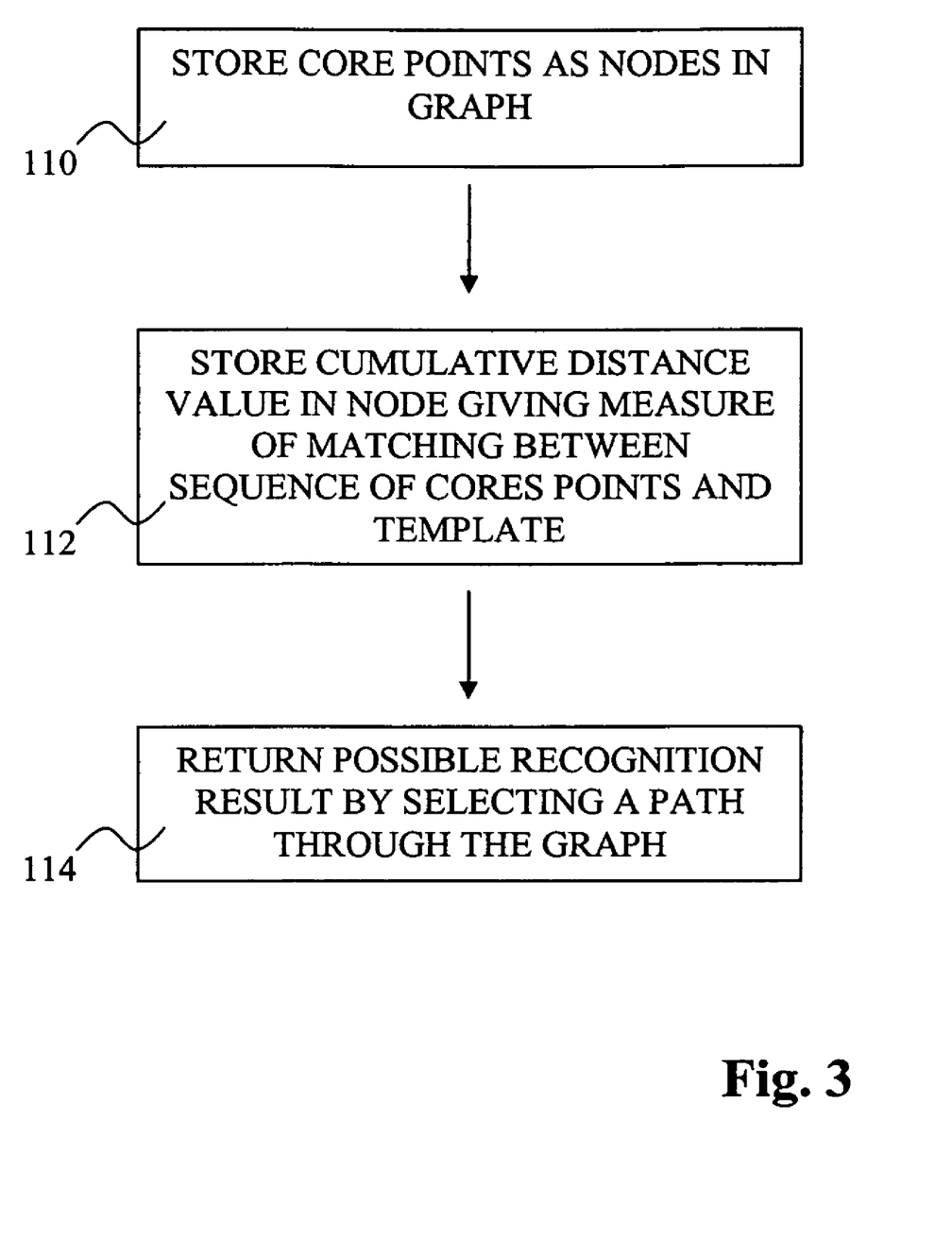
FIG. 3 is a flow chart of a method for comparing a handwritten pattern to templates.
Figure 4:
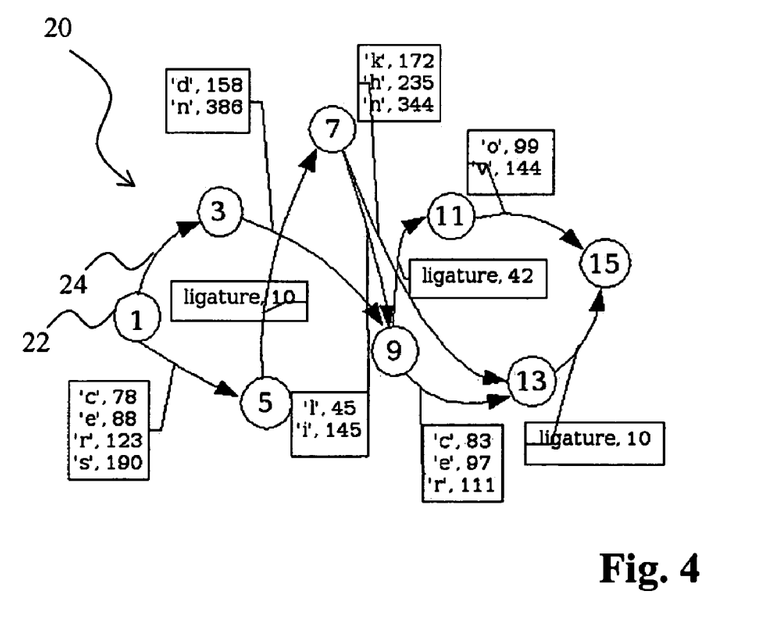
FIG. 4 is a chart of a graph that has been formed for determining distance values between templates and the handwritten pattern.

Referring now to FIGS. 3 and 4, the comparing of the features of the selected core points 12 of a handwritten pattern 10 to templates will be described. The core points 12 may be considered potential segmentation points of the handwritten pattern 10. Further, a sequence of core points 12 from a first potential segmentation point to a second potential segmentation point is considered a representation of a potential symbol in the handwritten pattern. Thus, the features of sequences of core points 12 are compared to the templates.

The selected core points 12 represent a relatively large number of different sequences of core points 12 that may be compared to the templates. In order to structure the comparison, the core points 12 may be analyzed in sequence. Starting at the first core point 12, any possible sequence of core points 12 is matched with templates. The end core point 12 of a sequence that matches a template is stored as a node in a graph, step 110. A distance value giving a measure of the matching between the sequence of core points and the template is stored in the node representing a path between the first core point and the node, step 112. When all possible sequences of core points 12 from the first core point have been matched to the templates, further matching is made starting at core points 12 which have been stored as nodes in the graph. Now, the distance values between templates and a further sequence of core points may be added to the first distance value stored for the starting node of the further sequence of core points. Thus, a cumulative distance value may be stored at nodes in the graph. In this way, an acyclic graph is formed for all the core points 12 and the last core point in the graph will hold information of cumulative distance values for different paths through the graph. Then, a possible recognition results of the handwritten pattern 10 may be returned by selecting a path through the graph representing a sequence of templates, step 114. The selected path may be the path having the smallest cumulative distance value, but may also be another path which represents a sequence of templates that exist in a dictionary.

In FIG. 4, a graph 20 is shown representing a matching of the handwritten pattern 10 in FIG. 2 to templates. The graph comprises nodes 22 represented as numbered circles and arches 24 between the nodes. As can be seen, there are several paths through the graph representing different segmentations of the handwritten pattern. The matching of the handwritten pattern 10 to templates thus simultaneously defines possible segmentations of the handwritten pattern 10 and produces a measure of the resemblance between the segmented handwritten pattern 10 and a sequence of templates.

The distance value between one core point in the handwritten pattern and one point in the templates may be a weighted sum of the absolute values of the differences between the features of the points. The distance value between a sequence of core points and a template is the sum of the distance values between the individual points. However, in an embodiment of the invention the distances of core points forming nodes in the graph may be calculated only once. Thus, the distance between the core point forming the node and the templates may be assigned to a path to or from the node and reflects a mean distance between the core point and both templates corresponding to paths to and from the node.

Figure 5:
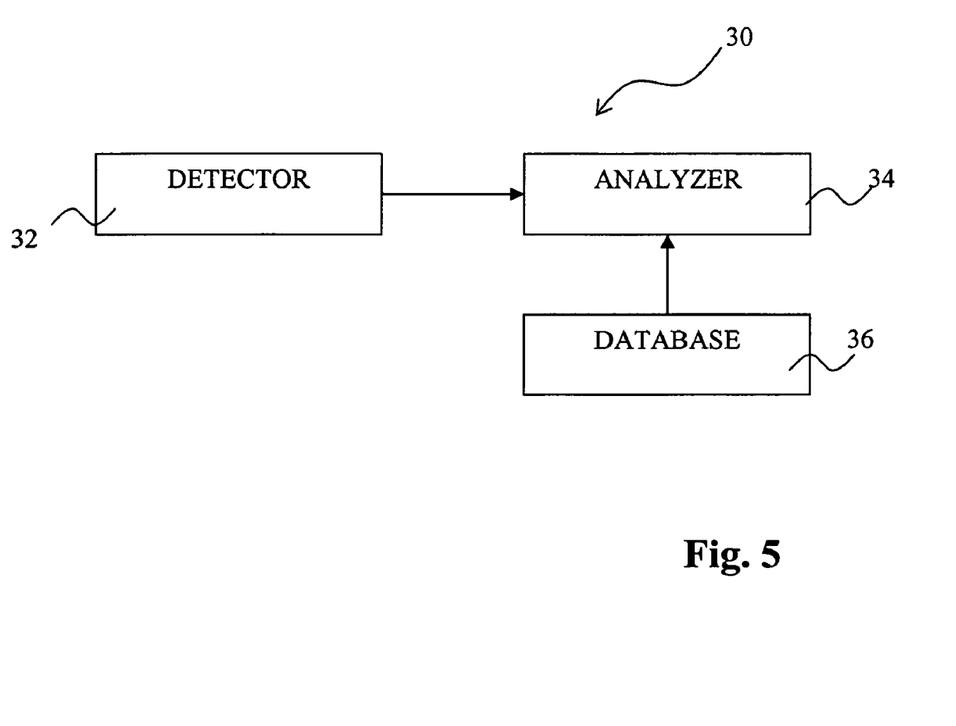
FIG. 5 is a schematic view of a device for recognizing a handwritten pattern according to an embodiment of the invention.

Referring now to FIG. 5, a device 30 for recognition of a handwritten pattern will be described. The device 30 may comprise a detector 32 for recording a handwritten pattern as a sequence of points. The detector 32 may be implemented as a pressure-sensitive screen on which a user may write. The device 30 further comprises an analyzer 34 for analyzing the detected handwritten pattern. The analyzer 34 may be implemented as a program running on a central processing unit of a computer. The analyzer 34 may be arranged to select core points of the handwritten pattern and arranged to determine features of the handwritten pattern at or in the vicinity of the core points. The device 30 further comprises a database 36 comprising templates represented as features of core points. The analyzer 34 may be further arranged to calculate distance values between features of a sequence of core points of the handwritten pattern and templates. The analyzer 34 may be arranged to form a graph for structurally comparing the handwritten pattern to templates and produce at least one possible recognition result of the handwritten pattern. The possible recognition result may be presented on a display, which may be separate to the pressure-sensitive screen or incorporated with the pressure-sensitive screen on which the handwritten pattern was entered.

It should be emphasized that the preferred embodiment described herein is in no way limiting and that many alternative embodiments are possible within the scope of protection defined by the appended claims.

The invention claimed is:

1. A method for recognition of a handwritten pattern comprising one or more curves representing a plurality of symbols, said method comprising using a processor analyzer to implement the following steps:
   detecting the handwritten pattern as a sequence of points along the one or more curves of the handwritten pattern,
   selecting core points among the sequence of points, wherein said core points are selected for use in segmenting the handwritten pattern and recognizing these segments of the handwritten pattern as symbols,
   determining features of the one or more curves at or in the vicinity of each core point, comparing the handwritten pattern to templates, each template representing at least one symbol or part of a symbol, said comparing comprising:
      stepwise analyzing the core points in sequence, wherein core points represent possible segmentation points, and sequences of core points from a first possible segmentation point to a second possible segmentation point represent possible symbols, said analyzing being performed by
      matching the features of sequences of core points that either start with the first core point or the last core point of a previous sequence of core points to said templates and calculating a distance value, and
      assigning a cumulative distance value to the last core point in the sequence of core points, whose features have been matched to templates, said cumulative distance value being a sum of a distance value assigned to the first core point in the sequence and the calculated distance value,
   whereby a smallest cumulative distance value for all sequential core points is assigned to the last core point and corresponds to a sequence of matched templates which represent a plurality of symbols as a possible recognition result of the handwritten pattern.

2. The method according to claim 1, wherein said comparing is performed by:
   forming a graph having nodes and arches connecting the nodes, wherein each node represents a core point corresponding to a possible segmentation point between two symbols in the handwritten pattern and each arch represents a path along a sequence of core points from one node to another node, said path corresponding to a possible symbol in the handwritten pattern,
   assigning at least one distance value to each path by matching the features of the sequence of core points to said templates, and
   determining at least the path through the graph from the first node to the last node with the smallest cumulative distance value, said path corresponding to a sequence of matched templates which represent a plurality of symbols as a possible recognition result of the handwritten pattern.

3. The method according to claim 2, wherein several possible recognition results are determined corresponding to paths through the graph having cumulative distance values below a threshold value.

4. The method according to claim 2, wherein said graph is formed by sequentially adding core points as nodes and wherein said assigning of at least one distance value to each path is performed during forming of the graph.

5. The method according to claim 2, wherein said assigning of at least one distance value comprises assigning each path the lowest distance value corresponding to the template that best matches the features of the sequence of core points.

6. A computer readable medium, comprising a computer program, directly loadable into the internal memory of a data handling unit, comprising software code portions for performing the method according to claim 2.

7. The method according to claim 1, wherein a number of core points being selected is limited by the shape of said one or more curves.

8. The method according to claim 7, wherein the number of core points being selected is limited to points holding information of directional changes of said one or more curves.

9. The method according to claim 1, wherein said selecting of core points comprises selecting points which are local extreme points of said one or more curves in a direction orthogonal to a main writing direction of the handwritten pattern.

10. The method according to claim 1, wherein said selecting of core points comprises selecting points in which an absolute value of the derivative of the one or more curves exceeds a threshold value.

11. The method according to claim 1, wherein said selecting of core points comprises selecting a core point where a deviation of the one or more curves from a straight line between two adjacent core points exceeds a threshold value.

12. The method according to claim 1, wherein the determining of features comprises determining a y-coordinate of the core point, said y-coordinate defining a position in a direction orthogonal to a main writing direction.

13. The method according to claim 1, wherein the determining of features comprises determining a direction of the curve towards the core point and a direction of the curve from the core point.

14. The method according to claim 1, wherein the determining of features comprises determining a x-coordinate displacement from a previous core point, said x-coordinate defining a position in a direction parallel with a main writing direction.

15. The method according to claim 1, wherein the determining of features comprises determining whether a pen has been lifted up or pressed down in the core point.

16. The method according to claim 1, wherein the distance value between a core point in the handwritten pattern and a point of a template is calculated as a weighted sum of the distance between each feature of the core point and the point of the template.

17. The method according to claim 1, wherein the handwritten pattern is compared to templates, wherein a plurality of templates represent different appearances of the same symbol.

18. The method according to claim 1, wherein the possible recognition result of the handwritten pattern is compared to a dictionary.

19. The method according to claim 1, wherein specific sequences of matched templates are disallowed.

20. The method according to claim 1, wherein a weight is given to the cumulative distance value for specific sequences of matched templates.

21. The method according to claim 1, wherein the handwritten pattern is written in cursive writing.

22. A computer readable medium, comprising a computer program, directly loadable into the internal memory of a data handling unit, comprising software code portions for performing the method according to claim 1.

23. A device for recognition of a handwritten pattern comprising one or more curves representing a plurality of symbols, said device comprising:
  a detector, which is arranged to detect the handwritten pattern as a sequence of points along the one or more curves of the handwritten pattern,
  an analyzer, said analyzer being arranged to select core points among the sequence of points, wherein said core points are selected for use in segmenting the handwritten pattern and recognizing these segments of the handwritten pattern as symbols,
  said analyzer being further arranged to determine features of the one or more curves at or in the vicinity of each core point,
  said analyzer being further arranged to compare the handwritten pattern to templates, each template representing at least one symbol or part of a symbol, wherein said analyzer being arranged to compare the handwritten pattern to templates is arranged for:
    stepwise analyzing the core points in sequence, wherein core points represent possible segmentation points and sequences of core points from a first possible segmentation point to a second possible segmentation point represent possible symbols, said analyzing being performed by
    matching the features of sequences of core points that either start with the first core point or the last core point of a previous sequence of core points to said templates and calculating a distance value, and
    assigning a cumulative distance value to the last core point in the sequence of core points, whose features have been matched to the templates, said cumulative distance value being a sum of a distance value assigned to the first core point in the sequence and the calculated distance value,
  whereby a smallest cumulative distance value for all sequential core points is assigned to the last core point and corresponds to a sequence of matched templates which represent a plurality of symbols as a possible recognition result of the handwritten pattern.

* * * * *